(12) United States Patent
Nagler et al.

(10) Patent No.: US 12,435,609 B2
(45) Date of Patent: Oct. 7, 2025

(54) SYSTEM AND METHOD FOR MANAGING HYDROCARBON RECOVERY EQUIPMENT

(71) Applicant: Halliburton Energy Services, Inc., Houston, TX (US)

(72) Inventors: Andrew Nagler, Houston, TX (US); William Ruhle, Houston, TX (US); Andi Kabuci, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/509,016

(22) Filed: Nov. 14, 2023

(65) Prior Publication Data

US 2025/0154859 A1    May 15, 2025

(51) Int. Cl.
*E21B 43/26* (2006.01)
*E21B 21/08* (2006.01)
*E21B 44/00* (2006.01)
*E21B 47/06* (2012.01)
*E21B 47/12* (2012.01)
*E21B 49/00* (2006.01)
*G05B 17/02* (2006.01)

(52) U.S. Cl.
CPC .......... *E21B 43/2607* (2020.05); *G05B 17/02* (2013.01); *E21B 2200/20* (2020.05)

(58) Field of Classification Search
CPC ...... E21B 2200/20; E21B 47/06; E21B 44/00; E21B 49/00; E21B 43/26; E21B 21/08; E21B 43/267; E21B 2200/22; E21B 43/2607; E21B 49/087; E21B 47/12
See application file for complete search history.

(56) References Cited

FOREIGN PATENT DOCUMENTS

| WO | WO-2018143918 A1 | * | 8/2018 | ........... E21B 43/261 |
| WO | WO-2021021130 A1 | * | 2/2021 | ........... E21B 43/128 |

* cited by examiner

*Primary Examiner* — Zakiya W Bates
(74) *Attorney, Agent, or Firm* — DeLizio, Peacock, Lewin & Guerra LLP (57) ABSTRACT

Some implementations include a method for an electronic control system for controlling equipment at a wellsite. The method may include detecting input associated with a state change of the equipment at the wellsite. The method also may include simulating the state change of the equipment. The method also may include determining, based on the simulation of the state change, that the state change will cause undesirable conditions of the equipment at the wellsite.

9 Claims, 5 Drawing Sheets

SYSTEM AND METHOD FOR MANAGING HYDROCARBON RECOVERY EQUIPMENT

TECHNICAL FIELD

The disclosure generally relates to the field of hydrocarbon recovery, and more specifically to managing equipment used in recovering hydrocarbons from subsurface formations.

BACKGROUND

Equipment for recovering hydrocarbons from subsurface formations may include piping, valves, fracturing pumps, electric motors, electric generators, and other components. These components may be integrated to perform complex tasks related to recovering hydrocarbons. The equipment may experience high pressures, high temperatures, and other extreme conditions during hydrocarbon recovery. Given the equipment complexity and extreme conditions, equipment operators may benefit from systems and operations that augment equipment predictability and operator safety.

BRIEF DESCRIPTION OF THE DRAWINGS

Implementations of the disclosure may be better understood by referencing the accompanying drawings.

DESCRIPTION OF IMPLEMENTATIONS

The description that follows may include example systems, methods, techniques, and program flows that embody implementations of the disclosure. However, this disclosure may be practiced without these specific details. For clarity, some well-known instruction instances, protocols, structures, and techniques may not be shown in detail.

Overview

The various operations for recovering subsurface hydrocarbons may require a multitude of different equipment configurations and operations for using the equipment. Before commencing operations for a particular task (such as hydraulically fracturing a subsurface formation), some implementations include a system that simulates one or more of the operations on the equipment before the task is performed. That is, the system may simulate one or more operations without any actual physical operation of the equipment. For example, before hydraulically fracturing a subsurface formation, the system may simulate fluid flows through high pressure valves and operations of fracturing pump, valves, manifold, wellhead, sensors, and controllers. Some implementations also may simulate other phenomena, conditions, and equipment related to the fracturing operations (or other tasks). The simulation may indicate that the equipment is well-tuned and ready to perform the task, or the simulation may indicate that the equipment should be adjusted before performing the task.

Some implementations also may perform various simulations during performance of the task (such as during operations for hydraulically fracturing a subsurface formation). For example, hydraulic fracturing operations may entail operators providing user input to control valves, flowrates, and other aspects of hydraulic fracturing. Before allowing the control system to perform operations in response to the user input, the control system may perform real-time simulations to determine how the equipment will respond to the user input. For example, if the control system receives user input commanding the equipment to close a valve, the control system may prevent the controller from closing the valve until a simulation is performed. If the simulation indicates the valve closure is safe (will not exceed safe pressure levels in piping), the control system may close the valve. If the simulation indicates the valve closure is not safe (will exceed safe pressure levels), the control system may not pass the user input onto the valve controller—thereby precluding closure of the valve. These and other operations and components are described in greater detail below.

In some implementations, no quantity of physical flow in equipment at a wellsite is required to identify problems. However, the control system also may operate in real-time to ensure safety throughout the wellsite. Furthermore, some implementations of the control system may provide closed loop control actions to avoid predicted failures/incidents and closed loop safety interlocks to prevent failures/incidents. The control system also may help to identify and fix various component malfunctions and/or failures.

Given the above-noted capabilities, some implementations may avoid safety hazards and/or undesirable conditions at the wellsite via a priori and/or real-time simulation and verification. Without such capabilities, traditional systems may cause more safety hazards and/or undesirable conditions.

Example Environment

Figure 1:
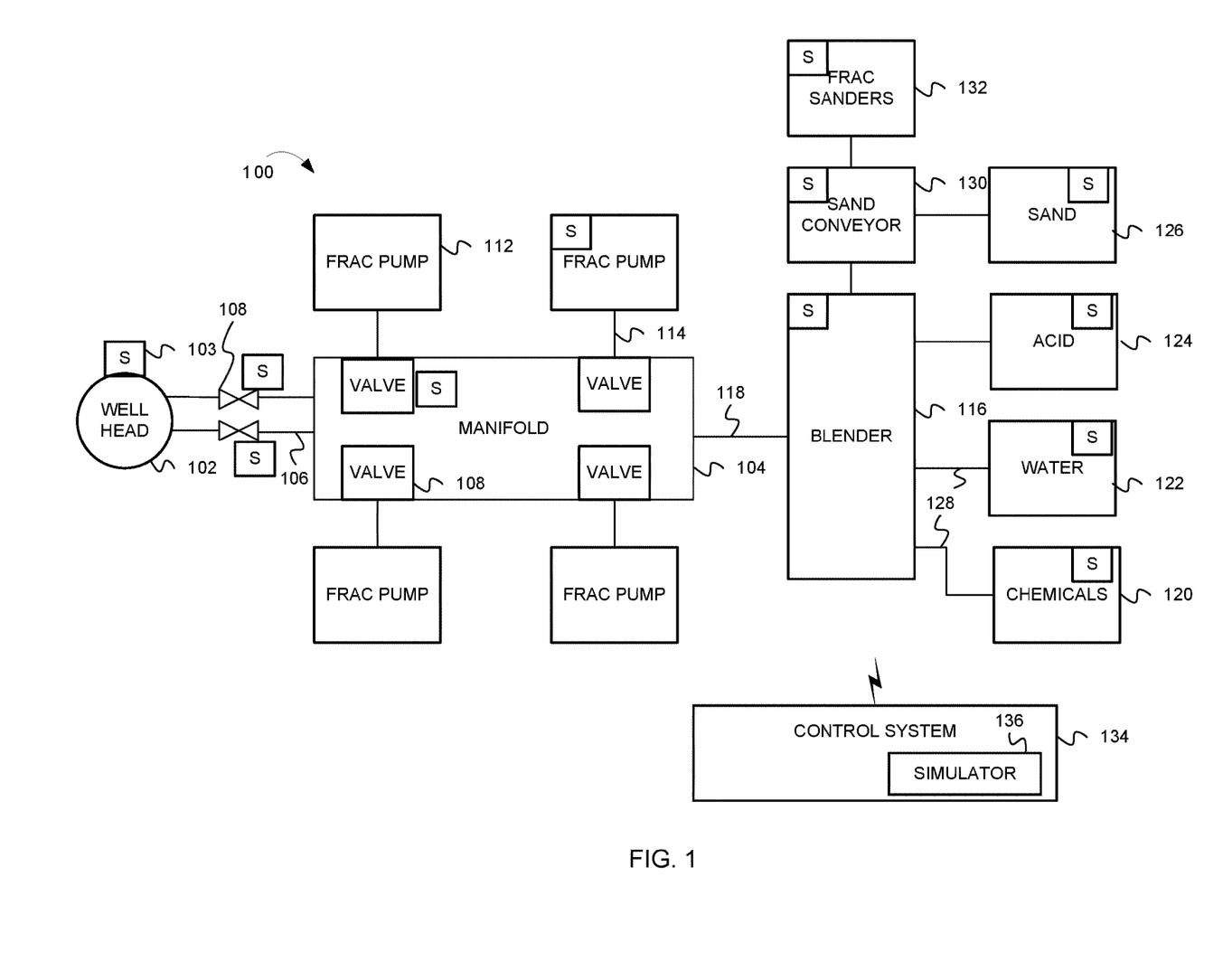
FIG. 1 is a block diagram illustrating a well system configured for hydraulically fracturing subsurface formations in one or more wells.

The control system described herein may be part of a larger system for drilling and fracturing well. FIG. 1 is a block diagram illustrating a well system configured for hydraulically fracturing subsurface formations in one or more wells. The well system 100 may include a wellhead 102 that is connected to a wellbore. The wellbore (not shown) may be fluidically connected to one or more subsurface formations for the purpose of hydrocarbon recovery. Although FIG. 1 shows only one wellhead 102, there may be any suitable number of wellheads 102 and wells.

The wellhead 102 may be equipped with one or more sensors 103 for measuring various conditions. The sensors 103 described herein may include sensors for measuring various conditions such as pressure, temperature, flow rate, strain, and/or other conditions. The wellhead 102 may be connected to a manifold 104 via piping 106. The piping 106 may include one or more pipes between the wellhead 102 and the manifold 104. Any of the piping between components at the wellsite may include or otherwise be coupled with one or more valves 108 and sensors 103. The manifold 104 may include a plurality of valves 108 and various internal piping (not shown) for performing hydraulic fracturing operations. Any of the valves described herein may include or otherwise be coupled with one or more sensors 103.

The manifold 104 may be connected to one or more fracturing pumps ("frac pumps") 112. The frac pumps 112 may include or be coupled with sensors 103. The manifold 104 also may be connected to a blender 116 via piping 118. The blender 116 may be connected via piping 128 to one or more chemical containers 120, water containers 122, and acid containers 124. The blender 116 also may be connected to a sand conveyor 130, where the sand conveyor 130 may be connected to the container of fracturing sanders 132. The blender 116, sand conveyor 130, and the containers (120, 122, 124, and 126) may include or otherwise be coupled with sensors 103 configured for sensing various conditions relevant to the fracturing process (such as level, consumption rate, and state of materials in the containers, state of the blender, and any other conditions).

The well system 100 also may contain a control system 134 configured to control one or more of the components of the well system 100. In some implementations, the control system 134 directly controls the equipment. However, the control system 134 may interact with various equipment controllers (not shown) and sensors 103 to perform operations of the well system 100. For example, the well system 100 may include separate controllers (not shown) for the manifold 104, blender 116, and wellhead 102. The control system 134 may transmit commands these separate controllers to change configurations (such as valve position, flow rate, etc.) of the manifold 104, blender 116, and wellhead 102.

The control system 134 may include a simulator 136. The simulator 136 may simulate operations (such as fracturing operations) performed by various configurations of the well system 100. For example, the simulator 136 may simulate the exact piping configurations, valve configurations, fracturing pump configurations, blender configuration, and configurations of the equipment at the wellsite. As a more specific example, the simulator 136 may simulate fluid flow in the well system 100 given a particular piping configuration, valve configuration, and pumping flow rate. The simulation may indicate fluid will flow through the piping and equipment. For example, the simulation may indicate through which pipes and components fluid will flow and at what rate, pressure, and temperature the fluid will flow. The simulator 136 may perform the simulation before the well system 100 is operational for a particular operation. By simulating particular configurations and operations of the well system 100, the control system 134 may determine that certain operations are unsafe or otherwise undesirable before the operations commence. The operations may be undesirable if they lead to undesirable states such as overpressure states (pressure in piping, valves, or other components that exceeds safe pressure thresholds), unsafe temperature states (temperatures outside of acceptable safety thresholds), overforce states (operations that may result in forces on equipment that exceed safe thresholds), and other undesirable states.

The control system 134 also may utilize the simulator 136 while the well system 100 is performing operations. For example, as the well system 100 performs operations for hydraulic fracturing, the control system 134 may detect user input or other state change. In the case of user input, such input may command the control system 134 to close a valve 108. Before closing the valve and while the fracturing operations are on-going, the control system 134 may simulate how closing the valve would change fluid flow in the well system 100. If the simulation indicates that closing the valve 108 may cause an undesirable and/or unsafe state (such as an over-pressure state, fluid flow to a hazardous or undesirable location, and/or other undesirable states), the control system 134 may not close the valve 108. The control system 134 also may send a message indicating that the command should be modified to avoid the unsafe/undesirable system state. The control system 134 itself may modify the command based on other states of the system. For example, the control system 134 may determine that the user likely intended to close a different valve 108 based on a state a particular frac pump 112. Hence, the control system 134 may modify the command so that it closes the different valve. The control system 134 may send the command to a valve controller (not shown) to execute the command by closing the other valve. As another example of real-time simulation, the control system 134 may continuously detect conditions (as referred to as states) via the sensors 103 and run simulations to determine whether those conditions may lead to undesirable or unsafe states of the well system 100. If conditions may lead to undesirable or unsafe states, the control system 134 may change the configuration of one or more components of the well system 100 (such as by changing a valve position, flow rate, etc.).

Example Operations and Configurations

Figure 2:
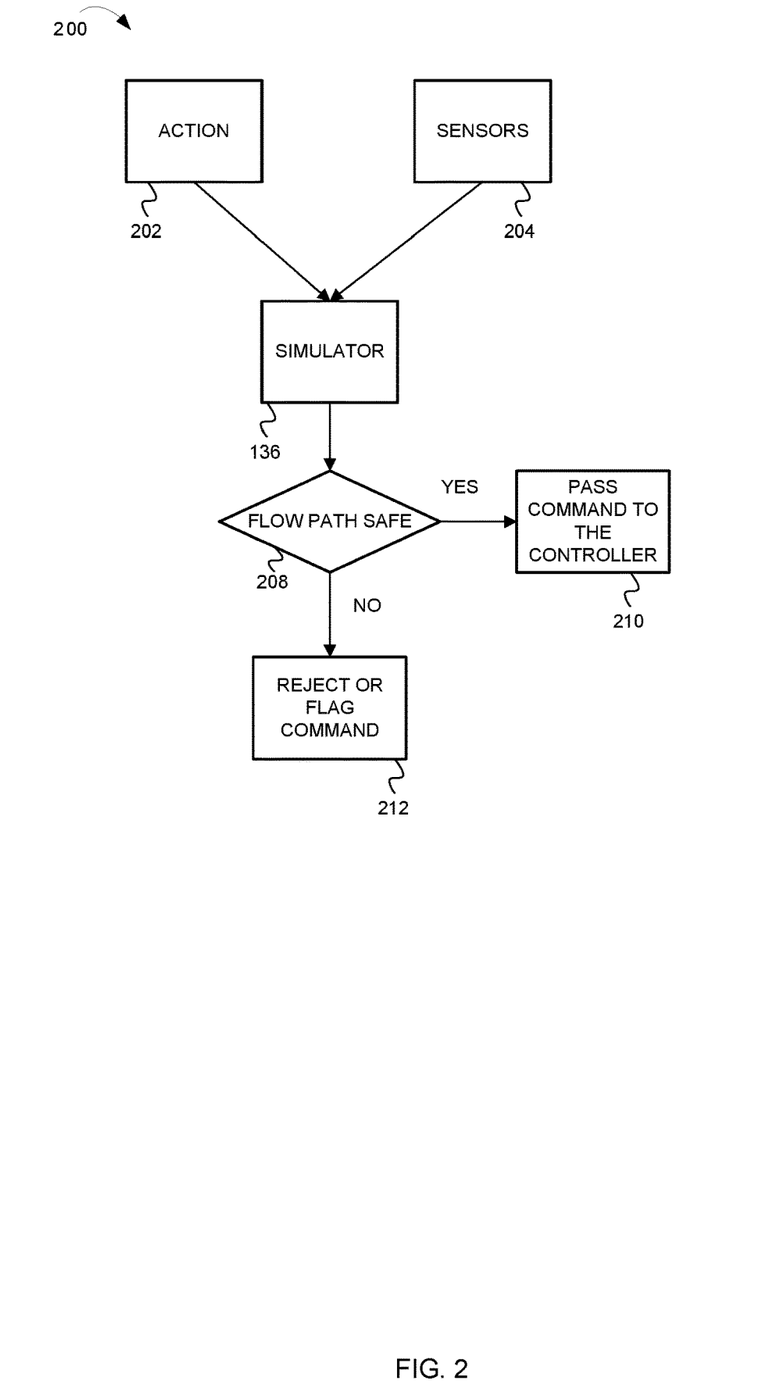
FIG. 2 is a block diagram showing components and operations for simulating commands before equipment becomes operational at a wellsite.

FIG. 2 is a block diagram showing components and operations for simulating commands before equipment becomes operational at a wellsite. In some implementations, the equipment may include the well system 100 as described with reference to FIG. 1.

In FIG. 2, a process 200 may begin. In the process, the simulator 136 may receive information from one or more components of the well system 100. The information may include one or more actions 202 such as setpoint commands entered into the system 100 via an operator or an automated component (such as a sub-system controller). For example, an operator may enter a setpoint command to close one or more valves or ramp-up one or more of the frac pumps 112. The simulator 136 may receive the set point command through a network interface, user interface, manual device, or in any other suitable way. The simulator 136 also may receive sensor input 204 such as readings from any of the sensors 103. For example, the sensor input may include a pressure reading from a sensor 103 configured to detect pressure in a pipe 106.

Based on the information and before the system is operational, the simulator 136 may determine how the command setpoint and/or sensor input may affect the system 100. For example, a command setpoint (if executed) may cause use one or more valves 108 to open or close-thereby changing the state of the system 100. The simulator 136 may determine flow paths and system states (such as pressures) that would arise if the command setpoint were executed by the system 100. The flow paths may indicate where (which pipes 106) and at what pressure(s) fluids may flow through the system 100. The simulator 136 may perform one or more simulations to determine how the setpoint command and/or sensor information would affect the system 100.

The simulator 136 may, at block 208, determine whether the prospective flow path is safe (at block 208). That is, the simulator 136 may determine whether it is safe to begin pumping fluid along the prospective flow path. A prospective flow path may be safe if a simulation indicates that a path of the fluid, pressures, and other parameters are within safe/desirable tolerances. A flow path may be outside of tolerance if the flow path moves fluids to unsafe locations or pressures that are outside acceptable tolerances. If a simulation shows that one or more pertinent valves are closed along the prospective flow path, the simulator may determine that the flow path is not safe to operate. If the prospective flow path is safe, operations of the simulator 136 proceed at block 210. Otherwise, operations of the simulator proceed at block 206.

At block 210, the simulator 136 may pass the setpoint command onto the control system 134 for execution of the setpoint command. For example, the simulator 136 may pass the command to open a particular valve 108 onto the control system 134. In turn, the control system 134 may open the valve 108. At this point, the system 100 may transition from an inoperative state to an operational state during which the setpoint command is executed by the system 100. In some implementations, the control system 134 may pass the command onto a sub-system controller (such as a frac pump controller or other sub-system controller (not shown)) for execution of the setpoint command.

At block 212, the simulator 136 may reject or flag the command. Without executing the setpoint command, the control system 134 and may present an error message indicating one or more problems associated with the setpoint command. The message may explain safety hazards, over-tolerance pressures, undesirable paths through the piping, or other problems that may occur if the command were executed.

Some implementations of the simulator 136 may modify commands that may lead to unsafe/undesirable conditions into different commands that may avoid the unsafe/undesirable conditions. For example, simulator 136 may modify a command to open a first valve into a one or more commands to close a second valve and then open the first valve. By closing the second valve before opening the first valve, the simulator 136 may avoid an unsafe condition.

Figure 3:
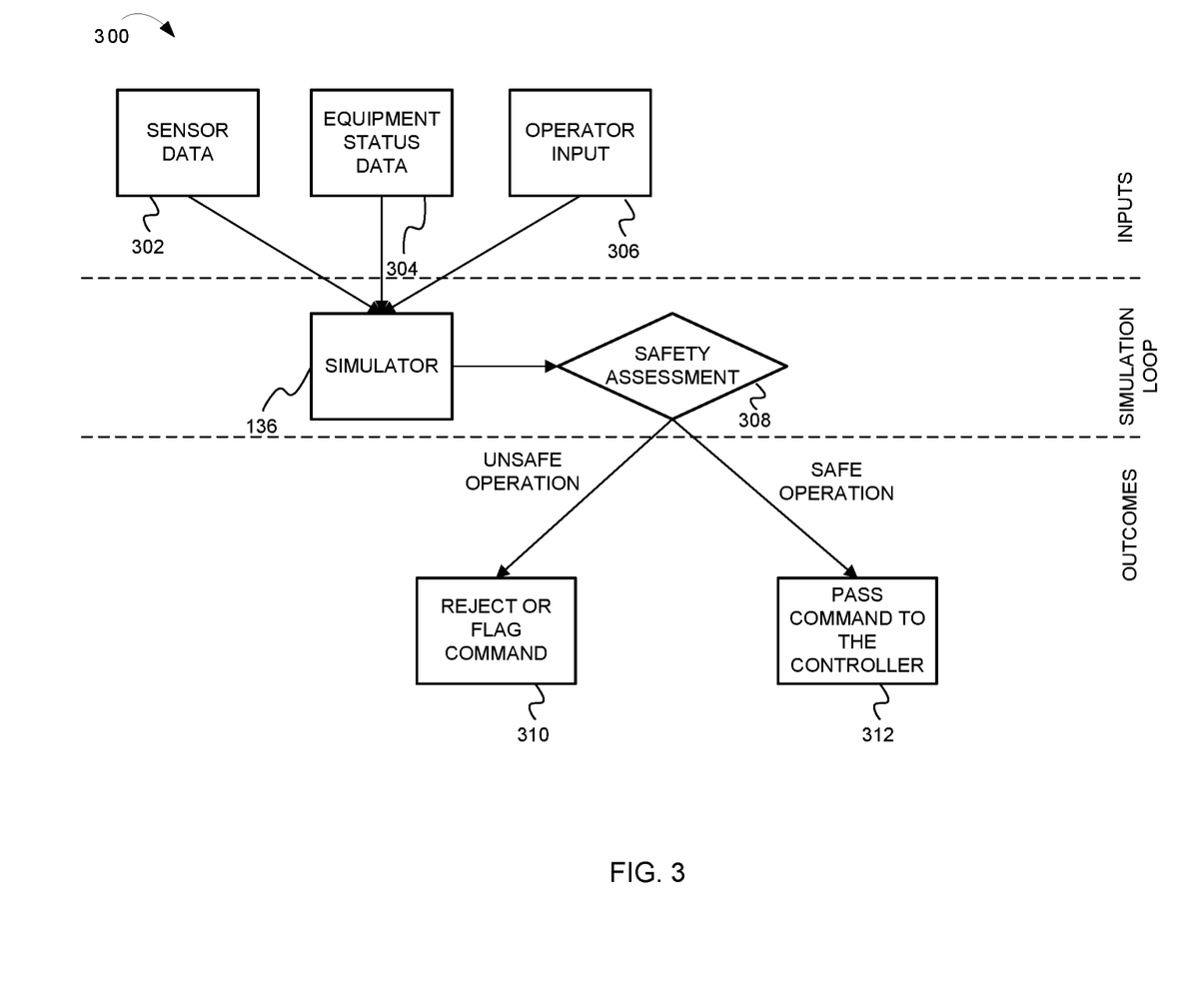
FIG. 3 is a block diagram illustrating components and operations for verifying, via simulation, actions of equipment at a wellsite.

Some implementations may perform real-time simulations to verify actions while the system 100 is operational (such as when the system 100 is performing hydraulic fracturing operations). For example, as the frac pumps 112 pump fluid through the system 100, the simulator 136 may simulate setpoint can and before the control system 134 executes them. FIG. 3 is a block diagram illustrating components and operations for verifying, via simulation, actions of equipment at a wellsite. In FIG. 3, a process 300 begins with the simulator 136 receiving information. The simulator 136 may receive sensor data 302, equipment status data 304, and/or operator input 306. The sensor data 302 may include sensor readings or other information determined by any of the sensors 103 (pressure, temperature, flow rate, viscosity, density, or any other suitable parameter). The equipment status data 304 can indicate any suitable equipment state. For example, the frac pumps 112 may indicate pump flow rate, engine speed (revolutions per minute), engine oil temperature, fuel consumption rate, or any other state of the frac pumps 112. Any of the components of the system 100 may produce equipment status data indicating a state of that component. The equipment status data 304 may be produced by a controller on wireline, the wellhead 102, tanks 120-126, the manifold 104, and video imaging components at the wellsite (not shown), and other components. Components of the system 100 may provide information such as when equipment is malfunctioning, surface lines are leaking, people are intruding into a dangerous work area, valves or pumping equipment are changing operational status, an event or step in a procedure, and other information. The operator input 306 may include setpoint commands (such as commands that open/close valves, change frac pump settings, etc.) and other operator input that may alter the state of the system 100.

The simulator 136 may perform a safety assessment based on the sensor data 302, equipment status data 304, and/or operator input 306. The simulator 136 may perform the safety assessment based on the physical layout and state of the well system 100. To determine the physical layout state of the well system 100, the simulator 136 may analyze configuration files, user settings, and any other information needed to accurately model the current configuration and state of the well system 100. As an example of such a safety assessment, an operator may input a command to move a valve toward a closed position while a frac pump 112 is pumping fluids. Before the system 100 executes the command to move the valve toward a closed position, the simulator 136 may simulate the resulting flow path and pressure (such as overpressure condition). The simulation may be based on the sensor data 302, equipment status data 304, and operator input 306. The simulation may indicate that the operation is safe or unsafe. If the operation is unsafe/undesirable, the simulator 136 may reject the command and present a message indicating the unsafe/undesired state that may result from executing the command. However, if the operation is safe/desirable, the simulator 136 may pass the command onto the control system 134 for execution on the system 100. In some implementations, the command may be passed on to a sub-system controller (such as a frac pump controller).

Because the simulator 136 may operate in real-time while the system 100 is operational, it may continuously loop through operations that receive information (status data 302, equipment status data 304, and/or operator input 306), perform safety assessments based on the information, and process commands (reject, flag, or pass-on commands).

Figure 4:
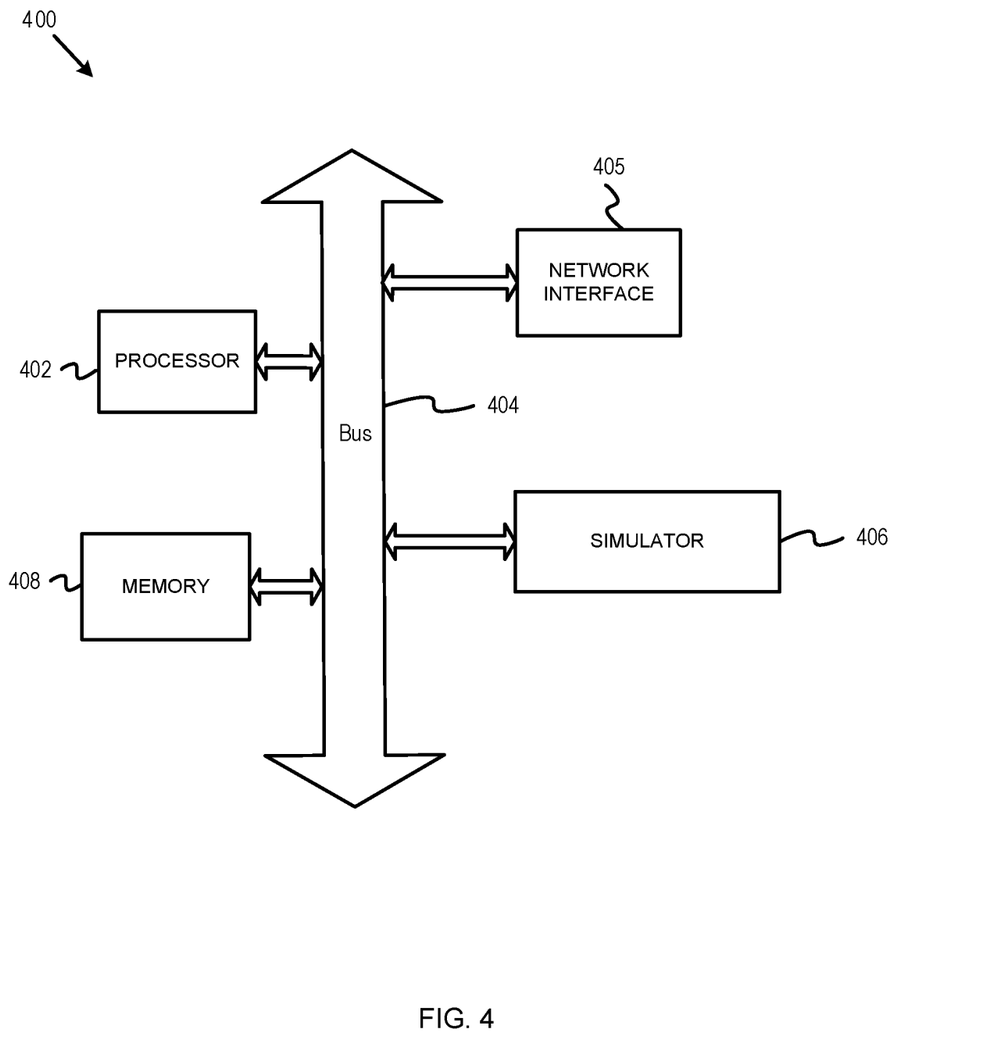
FIG. 4 is a block diagram illustrating a computer system that may be utilized with some implementations.

FIG. 4 is a block diagram illustrating a computer system that may be utilized with some implementations. In FIG. 4, a computer system 400 may include one or more processors 402 connected to a system bus 404. The system bus 404 may be connected to memory 408 and a network interface 405. The memory 408 may include any suitable memory random access memory (RAM), non-volatile memory (e.g., magnetic memory device), and/or any device for storing information and instructions executable by the processor(s) 402. The network interface 105 may provide connectivity to any suitable network, such as a wired network, wireless network, satellite network, etc.

The computer system 400 may include additional peripheral devices. For example, the computer system 400 may include multiple external multiple processors. In some implementations, any of the components can be integrated or subdivided.

The computer system 400 also may include a simulator 406. The simulator 406 may implement the methods and operations described herein. In some implementations, the simulator 406 may include components that implement operations for simulating commands, conditions, and states of a well system (such as the well system 100 show in FIG. 1). For example, the simulator 406 may include program instructions that implement simulations of commands and states of the system 100. In some implementations, the computer system 400 may be included in the well system 100 and may cooperate with controllers and other components to perform the functionality described herein.

Any component of the computer system 400 can be implemented as hardware, firmware, and/or machine-readable media including computer-executable instructions for performing the operations described herein. For example, some implementations include one or more non-transitory machine-readable media including computer-executable instructions including program code configured to perform functionality described herein. Machine-readable media includes any mechanism that provides (e.g., stores and/or transmits) information in a form readable by a machine (e.g., a computer system). For example, tangible machine-readable media includes read only memory (ROM), random access memory (RAM), magnetic disk storage media, optical storage media, flash memory machines, etc. Machine-readable media also includes any media suitable for transmitting software over a network.

Figure 5:
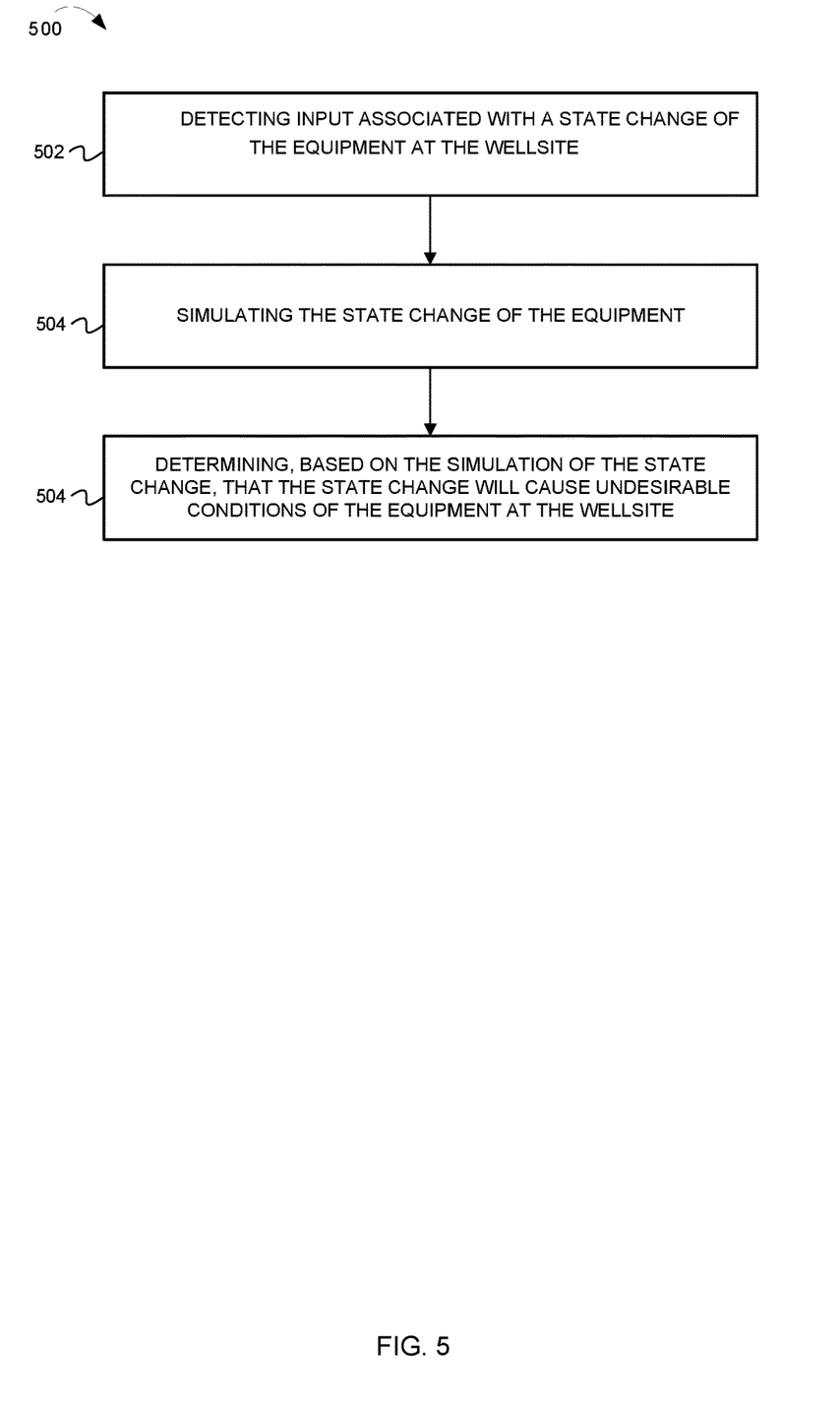
FIG. 5 is a flow diagram illustrating a method performed by some implementations.

FIG. 5 is a flow diagram illustrating a method performed by some implementations. The method may include operations performed by an electronic control system for controlling equipment at a wellsite. In FIG. 5, the flowchart 500 begins at block 502. At block 502, the control system may detect input associated with a state change of the equipment at the wellsite. At block 504, the control system may simulate the state change of the equipment. At block 506, the control system may determine, based on the simulation of the state change, that the state change will cause undesirable conditions of the equipment at the wellsite.

FIGS. 1-5 and the operations described herein are examples meant to aid in understanding example implementations and should not be used to limit the potential implementations or limit the scope of the claims. None of the implementations described herein may be performed exclusively in the human mind nor exclusively using pencil and paper. None of the implementations described herein may be performed without computerized components such as those described herein. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the implementations disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more implementations, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, e.g., one or more modules of computer program instructions stored on a computer storage media for execution by, or to control the operation of, a computing device.

If implemented in software, the functions may be stored on or transmitted over as one or more instructions or code on a computer-readable medium. The processes of a method or algorithm disclosed herein may be implemented in a processor-executable instructions which may reside on a computer-readable medium. Computer-readable media includes both computer storage media and communication media including any medium that may be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, some operations may be omitted and/or other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described should not be understood as requiring such separation in all implementations, and the described program components and systems may generally be integrated together in a single software product or packaged into multiple software products. Additionally, other implementations are within the scope of the following claims. In some cases, the actions recited in the claims may be performed in a different order and still achieve desirable results.

EXAMPLE CLAUSES

Some implementations may include the following clauses.

Clause 1: A method for an electronic control system for controlling equipment at a wellsite, the method comprising: detecting input associated with a state change of the equipment at the wellsite; simulating the state change of the equipment; and determining, based on the simulation of the state change, that the state change will cause undesirable conditions of the equipment at the wellsite Clause 2: The method of clause 1, wherein the input is a command to achieve the state change of the equipment, the method further comprising: rejecting the command to avoid the state change of the equipment.

Clause 3: The method of any one or more of clauses 1-2 wherein the detecting, simulating, and determining occur before the equipment at the wellsite is operational.

Clause 4: The method of any one or more of clauses 1-3 wherein the detecting, simulating, and determining occur while the equipment at the wellsite is performing hydraulic fracturing operations in a wellbore.

Clause 5: The method of any one or more of clauses 1-4, wherein the equipment includes a valve, and wherein the state change includes operator input to move the valve from an original position to a new position, the method further comprising: simulating operation of the equipment with the valve at the new position.

Clause 6: The method of any one or more of clauses 1-5, wherein the equipment at the wellsite includes piping from the surface down to at least one subsurface formation in multiple wells and valves to control fluid flow through the piping, and wherein modifying the equipment at the wellsite occurs before any fluids are flowing in the piping.

Clause 7: The method of any one or more of clauses 1-6, wherein the input indicating the state change is an initial command to initiate use of the equipment before fluids are flowing in piping included in the equipment.

Clause 8: The method of any one or more of clauses 1-7, wherein the input includes a setpoint command indicating flowrate of fluid in piping of the equipment, and wherein the simulating determines pressure in the piping that would result from the flowrate Clause 9: The method of any one or more of clauses 1-8, wherein the input is an operator-entered setpoint command to implement the state change of the equipment, the method further comprising: modifying, without any additional operator input, the setpoint command into one or more different commands to implement a different state change of the equipment; and transmitting the one or more different commands to an equipment controller to achieve the different state change of the equipment Clause 10: One or more machine-readable mediums including instructions that, when executed by a processor, cause the processor to control equipment at a wellsite, the instructions comprising: instructions to detect input associated with a state change of the equipment at the wellsite; instructions to simulate the state change of the equipment; and instruction to determine, based on the simulation of the state change, that the state change will cause undesirable conditions of the equipment at the wellsite.

Clause 11: The one or more machine-readable mediums of clause 10, wherein the input is a command to achieve the state change of the equipment, the instructions further comprising: instructions to reject the command to avoid the state change of the equipment.

Clause 12: The one or more machine-readable mediums of any one or more of clauses 10-11, wherein the instructions to detect, simulate, and determine are to be executed before the equipment at the wellsite is operational.

Clause 13: The one or more machine-readable mediums of any one or more of clauses 10-12, wherein the instructions to detect, simulate, and determine are to be executed while the equipment at the wellsite is performing hydraulic fracturing operations in a wellbore.

Clause 14: The one or more machine-readable mediums of any one or more of clauses 10-13, wherein the equipment includes a valve, and wherein the state change includes operator input to move the valve from an original position to a new position, the instructions further comprising: instructions to simulate operation of the equipment with the valve at the new position.

Clause 15: The one or more machine-readable mediums of any one or more of clauses 10-14, wherein the input is an operator-entered setpoint command to implement the state change of the equipment, the instructions further comprising: instructions to modify, without any additional operator input, the setpoint command into one or more different commands to implement a different state change of the equipment; and instructions to transmit the one or more different commands to an equipment controller to achieve the different state change of the equipment.

Clause 16: An apparatus comprising: a processor; one or more machine-readable mediums including instructions that, when executed by a processor, cause the processor to control equipment at a wellsite, the instructions comprising: instructions to detect input associated with a state change of the equipment at the wellsite; instructions to simulate the state change of the equipment; and instruction to determine, based on the simulation of the state change, that the state change will cause undesirable conditions of the equipment at the wellsite.

Clause 17: The apparatus of clause 16, wherein the input is a command to achieve the state change of the equipment, the instructions further comprising: instructions to reject the command to avoid the state change of the equipment.

Clause 18: The apparatus of any one or more of clauses 16-17 wherein the instructions to detect, simulate, and determine are to be executed before the equipment at the wellsite is operational.

Clause 19: The apparatus of any one or more of clauses 16-18, wherein the instructions to detect, simulate, and determine are to be executed while the equipment at the wellsite is performing hydraulic fracturing operations in a wellbore.

Clause 20: The apparatus of any one or more of clauses 16-19, wherein the equipment includes a valve, and wherein the state change includes operator input to move the valve from an original position to a new position, the instructions further comprising: instructions to simulate operation of the equipment with the valve at the new position.

What is claimed is:

1. A method for an electronic control system for controlling equipment at a wellsite, the method comprising:
   detecting input associated with a state change of the equipment at the wellsite;
   simulating the state change of the equipment; and
   determining, based on the simulation of the state change, that the state change will cause undesirable conditions of the equipment at the wellsite.

2. The method of claim 1, wherein the input is a command to achieve the state change of the equipment, the method further comprising:
   rejecting the command to avoid the state change of the equipment.

3. The method of claim 1, wherein the detecting, simulating, and determining occur before the equipment at the wellsite is operational.

4. The method of claim 1, wherein the detecting, simulating, and determining occur while the equipment at the wellsite is performing hydraulic fracturing operations in a wellbore.

5. The method of claim 1 wherein the equipment includes a valve, and wherein the state change includes operator input to move the valve from an original position to a new position, the method further comprising:
   simulating operation of the equipment with the valve at the new position.

6. The method of claim 1 wherein the equipment at the wellsite includes piping from the surface down to at least one subsurface formation in multiple wells and valves to control fluid flow through the piping.

7. The method of claim 1, wherein the input indicating the state change is an initial command to initiate use of the equipment before fluids are flowing in piping included in the equipment.

8. The method of claim 1, wherein the input includes a setpoint command indicating flowrate of fluid in piping of the equipment, and wherein the simulating determines pressure in the piping that would result from the flowrate.

9. The method of claim 1, wherein the input is an operator-entered setpoint command to implement the state change of the equipment, the method further comprising:
   modifying, without any additional operator input, the setpoint command into one or more different commands to implement a different state change of the equipment; and
   transmitting the one or more different commands to an equipment controller to achieve the different state change of the equipment.

* * * * *